United States Patent [19]

Satoh

[11] Patent Number: 5,673,079
[45] Date of Patent: Sep. 30, 1997

[54] IMAGE COMMUNICATION APPARATUS WITH INTERACTIVE OPERATOR DISPLAY

[75] Inventor: Makoto Satoh, Tokyo, Japan

[73] Assignee: Canon Kabushiki Kaisha, Tokyo, Japan

[21] Appl. No.: 245,852

[22] Filed: May 19, 1994

Related U.S. Application Data

[63] Continuation of Ser. No. 68,246, May 27, 1993, abandoned.

[30] Foreign Application Priority Data

May 29, 1992 [JP] Japan ................................ 4-139093

[51] Int. Cl.$^6$ .............................. H04N 7/14; H04N 5/45
[52] U.S. Cl. .................... 348/15; 348/14; 348/565
[58] Field of Search ............................ 348/15, 14, 17, 348/16, 18, 19, 13, 12, 10, 584, 588, 589, 578, 565, 566, 564, 581, 582, 580, 704, 705, 706, 20; 379/202–205; H04N 7/15, 7/14, 5/445, 5/45

[56] References Cited

U.S. PATENT DOCUMENTS

| | | | |
|---|---|---|---|
| 4,650,929 | 3/1987 | Boerger et al. | 358/85 |
| 4,746,980 | 5/1988 | Petersen | 358/160 |
| 4,996,592 | 2/1991 | Yoshida | 358/85 |
| 4,996,594 | 2/1991 | Murayama | 358/85 |
| 5,073,926 | 12/1991 | Suzuki et al. | 379/53 |
| 5,384,588 | 1/1995 | Martin et al. | 348/15 |
| 5,392,284 | 2/1995 | Sugiyama | 348/17 |
| 5,418,560 | 5/1995 | Yasuda | 348/14 |
| 5,448,285 | 9/1995 | Kadowaki | 348/14 |

FOREIGN PATENT DOCUMENTS 0362610  4/1990  European Pat. Off. ......... H04N 7/15

OTHER PUBLICATIONS

Schaas, G., "Eine Symbiose gewinnt Konturen," Funkschau, vol. 63, No. 12, May 31, 1991, Munchen DE, pp. 29–32.
European Patent Office Communication, Application No. 93304188.1, Date Sep. 17, 1993, p. 1.

*Primary Examiner*—Glenton B. Burgess
*Assistant Examiner*—John W. Miller
*Attorney, Agent, or Firm*—Morgan & Finnegan LLP.

[57] ABSTRACT

In the terminal A, the input image "ABC" is displayed in a window 200A, with a rectangular frame 206A indicating the area of transmission. The image in the transmission area is enlarged, and transmitted to the terminal B after compression. In the terminal B, the input image "efghij" is displayed in a window 200B, with a rectangular frame 206B indicating the area of transmission. The image in the transmission area is enlarged, and transmitted to the terminal A after compression. In the terminal A, the image in a selected area (display area) of the received image is displayed in a window 202A. Also a window 204A displays the position and size of the display area within the entire received image. The transmission area of the input image and the display area of the received image can be enlarged, reduced or displaced.

13 Claims, 6 Drawing Sheets

TERMINAL A

FIG. 4B

TERMINAL B

FIG. 5A

TERMINAL A

FIG. 5B

TERMINAL B

FIG. 6A

TERMINAL A

FIG. 6B

TERMINAL B

FIG. 7A

RECEIVED IMAGE DISPLAY WINDOW

204A 208A 200A

RECEIVED IMAGE DISPLAY POSITION WINDOW    INPUT IMAGE DISPLAY WINDOW

TERMINAL A

FIG. 7B

RECEIVED IMAGE DISPLAY WINDOW

204B(208B) 200B

RECEIVED IMAGE DISPLAY POSITION WINDOW    INPUT IMAGE DISPLAY WINDOW

TERMINAL B

FIG. 8A

TERMINAL A

FIG. 8B

TERMINAL B

FIG. 9A

TERMINAL A

FIG. 9B

TERMINAL B

FIG. 10A

TERMINAL A

FIG. 10B

TERMINAL B

FIG. 11A

TERMINAL A

FIG. 11B

TERMINAL B

TERMINAL A

TERMINAL B

TERMINAL A

TERMINAL B

IMAGE COMMUNICATION APPARATUS WITH INTERACTIVE OPERATOR DISPLAY

This is a continuation of application Ser. No. 08/068,246, filed on May 27, 1993 now abandoned.

BACKGROUND OF THE INVENTION

1. Field of the Invention

The present invention relates to an image communication apparatus, and more specifically to an image communication apparatus adapted for use in a TV telephone system or a TV conference system.

2. Related Background Art

The communication standards for the TV telephone system are recently being investigated by the CCITT, and the image communication through the public digital channels, the private digital channels and the inter-computer network systems are under development.

Figure 2:
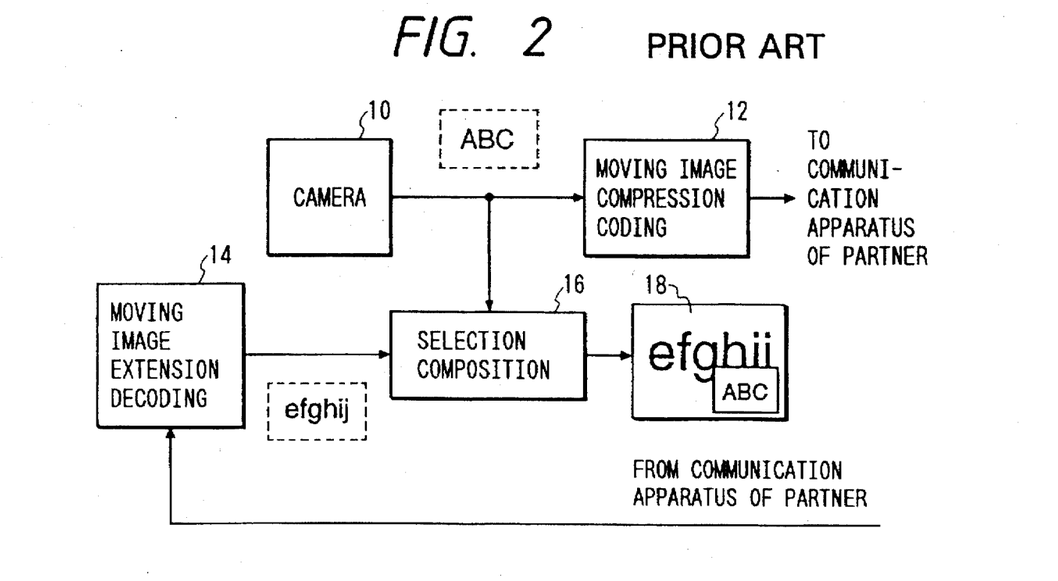
FIG. 2 is a schematic block diagram of a conventional configuration.

FIG. 2 is a block diagram of a moving image processing unit of a TV telephone apparatus constituting a conventional example, as a reference to the present invention. A video camera 10 takes the image of a speaker or a document, and a moving image compressing circuit 12 compresses the output of the video camera 10 and transmits it to a destination unit. A compressed image received from such a destination unit is expanded in a moving image expand/decoding circuit 14, in which the received image is reproduced.

A selection/composition circuit 16 selects or synthesizes (for example picture-in-picture) the output (input image) of the video camera 10 and the output (received image) of the moving image expand/decoding circuit 14, and supplies a monitor 18 with the selected or synthesized image signal. For the purpose of explanation, the input image to the video camera 10 is assumed as "ABC" and the image received from the partner unit is assumed as "efghij". The monitor 18 is displaying a picture-in-picture image synthesized by the circuit 16, with the received image as a mother image and the input image from the video camera 10 as a daughter image.

The selection/composition circuit 16 utilizes a commercially available picture-in-picture IC, and is usually provided, in addition to the above-mentioned function, with functions of interchanging the mother and daughter images and moving the daughter image to four corners of the image frame.

In the conventional image communication apparatus, particularly the TV telephone apparatus, the input image is directly transmitted to the partner unit and is displayed on the monitor thereof, and the video camera 10 is so adjusted to take a narrow shot, with the face of the speaker at the center.

In such conventional TV telephone apparatus, the users mutually converse while observing the received image and/or the input image displayed on the monitors 18. As a result, since the attention of the user is concentrated on the moving image display on the monitor 18, his viewing field becomes narrower than in the ordinary conversation by voice only, and he may not notice the change taking place behind him.

Also in the TV telephone apparatus, or in a terminal of the TV conference system, the speaker has to intentionally adjust the direction of his face, while observing the input image. In order to avoid such tediousness, some video cameras 10 are given a swinging mechanism, but the speaker has to reach for the video camera in order to vary the angle thereof. A remote control unit for this purpose is not cost effective for use by each speaker.

Also in case there are plural speakers in the same apparatus, as in the TV conference, it is sometimes desirable to switch the shot of all the attendants and the shot of an individual speaker in the transmission to the partner apparatus. However, for such purpose, there are required a mechanical mechanism and an optical zooming mechanism, so that the control becomes more complex.

Also in the received image, it is sometimes desired to magnify a part of the received image, such as a document or a model, in the course of the communication. In the conventional apparatus, such partial magnification is achieved by providing a zooming mechanism and a swinging mechanism at the transmitting side, so that the terminal becomes complex and expensive.

SUMMARY OF THE INVENTION

An object of the present invention is to provide an image communication apparatus capable of individually or collectively resolving the above-mentioned drawbacks.

Another object of the present invention is to provide an image communication apparatus capable of arbitrarily selecting the image to be synthesized, without replying on a complex configuration.

Still another object of the present invention is to provide an image communication apparatus capable of providing a partial magnified image, from an image represented by image data received from another unit.

Still another object of the present invention is to provide an image communication apparatus capable of arbitrarily selecting the area of an image represented by image data to be transmitted to another unit.

The foregoing objects can be attained, according to a preferred embodiment of the present invention, by an image communication apparatus comprising extraction means for extracting a transmission area selected from an input image and varying the size of the area to a predetermined size, transmission means for compressing the output image of the extraction means and transmitting the output image to other unit, and display means for displaying the input image together with a mark indicating the selected area, wherein the selected transmission area is arbitrarily variable and movable within the area of the input image.

Still another object of the present invention is to provide an image processing apparatus with novel functions.

Still another object of the present invention is to provide an image processing or communication apparatus improved in the convenience of use.

Still other objects of the present invention, and the features thereof, will become fully apparent from the following description of the embodiments, to be taken in conjunction with the attached drawings.

DETAILED DESCRIPTION OF THE PREFERRED EMBODIMENTS

Now the present invention will be clarified in detail by preferred embodiments thereof shown in the attached drawings. In the following description, a signal line and a signal thereon are represented by a same reference number.

Figure 1:
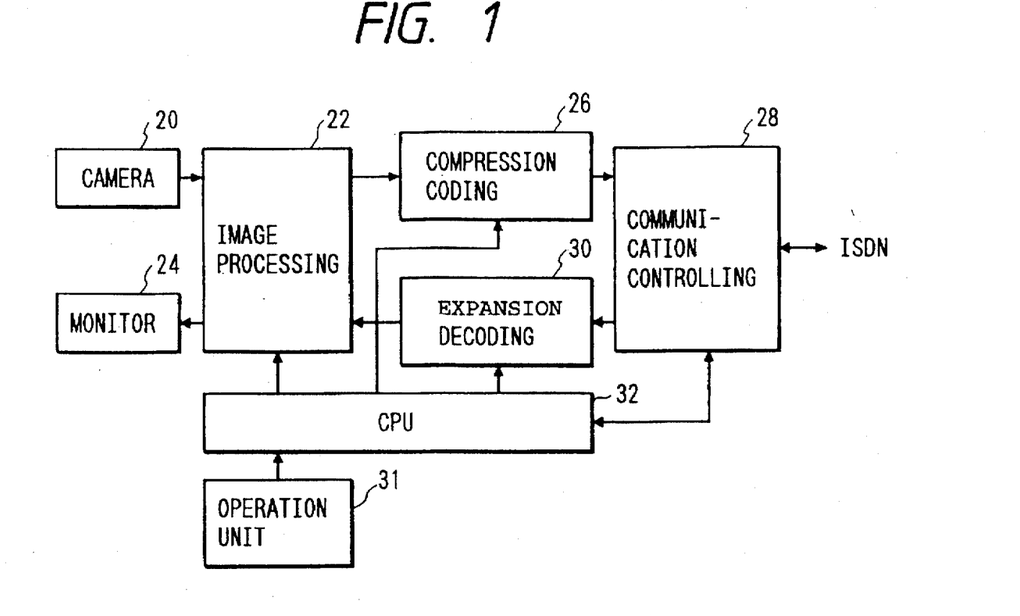
FIG. 1 is an entire block diagram of an embodiment of the present invention.

FIG. 1 is a schematic block diagram of an embodiment of the present invention, wherein a video camera 20, for taking the image of a speaker etc., sends the output (input image) to an image processing circuit 22. The circuit 22, also receiving a received image, selects or synthesizes selected portions of the input and received images for supply to a monitor 24, and supplies a compression encoding circuit 26 with the selection portion of the input image. The circuit 26 effects compression encoding of the selection portion of the input image supplied from the image processing circuit 22, and the compressed moving image information is transmitted to a partner unit through a communication control circuit 28 and an ISDN line.

The compressed moving image information, transmitted from the partner unit, is supplied through the communication control circuit 28 to an expansion decoding circuit 30 for expansion decoding, and the reproduced image from the circuit 30 is supplied, as explained above, to the image processing circuit 22.

A CPU 32 controls the image processing circuit 22, the compression encoding circuit 26, the communication control circuit 28 and the expansion decoding circuit 30, according to the instructions of the user given through an operation unit 31 and also according to the status of communication obtained from the communication control circuit 28.

Figure 3:
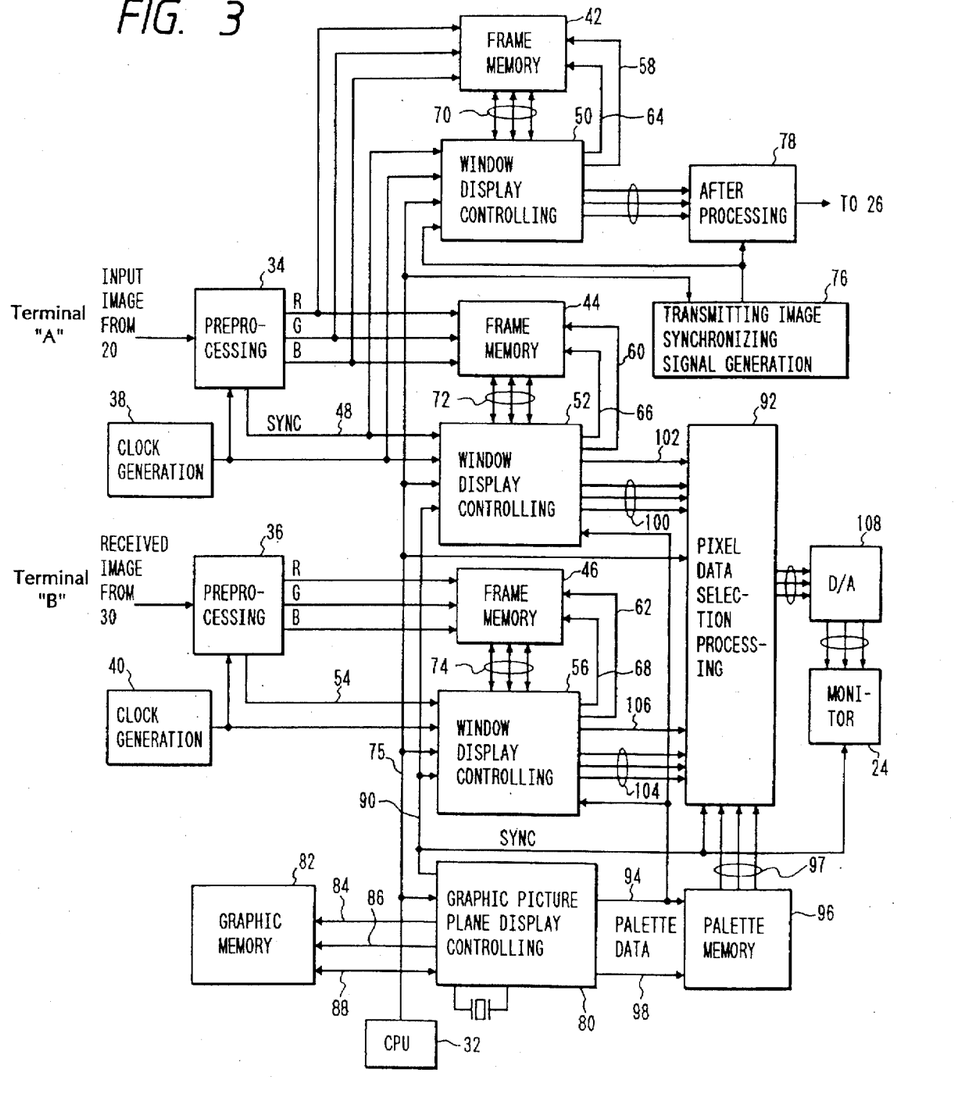
FIG. 3 is a schematic block diagram of an image processing circuit 22 featuring the present invention.

FIG. 3 is a block diagram of the image processing circuit 22. Each of preprocessing circuits 34, 36 is composed of an A/D converter, a synchronization signal separating circuit, a luminance/color difference component decoder and a color space transformation calculator, and converts an analog input image signal from the video camera 20 or an analog received image signal from the expansion decoding circuit 30 into digital R, G and B data, according to a clock signal from a clock generator 38 or 40.

The R, G, B data (input image) from the preprocessing circuit 34 are supplied to frame memories 42, 44 while those (received image) from the circuit 36 are supplied to a frame memory 46. The frame memories 42, 44, 46 are composed of ordinary dual port RAM's. Also the preprocessing circuit 34 sends horizontal/vertical synchronization signals, a blanking signal and an off/even field identification signal, obtained by extraction, to window display control circuits 50, 52 through a synchronization signal line 48, while the preprocessing circuit 36 sends similar signals to a window display control circuit 56 through a synchronization signal line 54.

The window display control circuits 50, 52, 56 are so-called memory control circuits, which control the signal write-in and read-out of the frame memories 42, 44, 46 by means of memory address signal lines 58, 60, 62 and memory control signal lines 64, 66, 68. The pixel data read from the memories 42, 44, 46 are supplied to the window display control circuits 50, 52, 56 through pixel data lines 70, 72, 74. The image data of an arbitrarily selected area can be read from the frame memories 42, 44, 46. The window display control circuits 50, 52, 56 are controlled by the CPU 32 through a control bus 75.

For the signal writing into the frame memories 42, 44, the window display control circuits 50, 52 receive a clock signal from the clock generator 38, and, for the signal writing into the frame memory 46, the window display control circuit 56 receives a clock signal from the clock generator 40.

A transmission sync signal generator 76 generates synchronization signals (horizontal/vertical sync signals, blanking signal and pixel data clock) for reading the image data from the memory 42 for supply to the compression encoding circuit 26. A post-processing circuit 78 effects a post-processing on the R, G, B data from the window display control circuit 50 according to the outputs of the circuit 76, and is composed of a color space transformation circuit, a luminance/color difference encoder, a sync signal multiplexing circuit and a D/A converter. The outputs of the circuit 76 are also supplied to the window display control circuit 50, for the purpose of signal reading from the memory 42.

A graphic image display control circuit 80 generates a background image in the display on the monitor 24 and also generates sync signals for display on the monitor 24. the circuit 80 is connected to a graphic memory 82 through a memory address signal line 84, a memory control signal line 86 and a data line 88, and temporarily stores the graphic image data, as palette data, in the graphic memory 82.

The sync signals generated by the circuit 80 are supplied to the window display control circuits 52, 56 through a synchronization signal line 90, for the signal reading from the memories 44, 46, and also supplied to a pixel data selection processing circuit 92 to be explained later and the monitor 24.

The control circuit 80 sends the pixel data (palette data), read from the graphic memory 82, to the window display control circuits 52, 56 and a palette memory 96 through a pixel data line 94. As will be explained later in more details, the palette data 94 determine, in the unit of each pixel, whether or not to display the input and received images in the display windows therefor. The palette memory 96 converts the palette data 94 from the graphic display control circuit 80 into R, G, B data for supply to the pixel data selection processing circuit 92 through a pixel data line 97. The control circuit 80 is capable of setting and varying the content of the palette memory 96 through a control line 98.

The window display control circuit 52 supplies the pixel data selection processing circuit 92 with the R, G, B data read from the frame memory 44 through a data line 100, and also sends an enable signal, indicating whether effective pixel data are present on the data line 100, to an enable signal line 102. Similarly the window display control circuit 56 supplies the pixel data selection processing circuit 92, with the R, G, B data read from the frame memory 46 through a data line 104, and sends an enable signal, indicating whether effective pixel data are present on the data line 104, to an enable signal line 104.

The pixel data selection circuit 92 selects or synthesizes the R, G, B pixel data 100, 104 from the window display control circuits 52, 56 and R, G, B pixel data 97 from the palette memory 96 for supply to the D/A converter 108. The pixel data selection processing circuit 92, according to the setting of various processing parameters by the CPU 32 through the control bus 75, executes the selection or synthesis in synchronization with a sync signal 90 from the graphic display control circuit 80. The D/A converter 108 converts the pixel data from the pixel data selection processing circuit 92 into an analog signal, for supply to the monitor 24.

In the following explained is the function of the circuits shown in FIG. 3. The input image from the video camera 20 is supplied to the pre-processing circuit 34, which executes the pre-processing of the analog input image signal in synchronization with the clock signal from the clock generator 38 and releases the R, G, B pixel data and the separated synchronization signals. The pixel data are supplied to the frame memories 42, 44 while the separated synchronization signals are supplied to the window display control circuits 50, 52.

The received image from the expand/decoding circuit 30 is supplied to the pre-processing circuit 36, which executes the pre-processing of the received analog image signal in synchronization with the clock signal from the clock generator 40 and releases the R, G, B pixel data and the separated synchronization signals 54. The R, G, B pixel data are supplied to the frame memory 46, while the separated synchronization signals are supplied to the window display control circuit 56.

The window display control circuits 50, 52 write the R, G, B pixel data (input image) from the pre-processing circuit 34 into the frame memories 42, 44 according to the clock signal from the clock generator 38 and the synchronization signals 48 separated in the pre-processing circuit 34, while the window display control circuit 56 writes the R, G, B pixel data (received image) from the pre-processing circuit 36, into the frame memory 46 according to the clock signal from the clock generator 40 and the synchronization signals separated in the pre-processing circuit 36.

Each of the frame memories 42, 44, 46 is capable of storing the R, G, B pixel data of a frame. The CPU 32 is so designed as to be capable of causing, through the control bus 75, the window display control circuits 50, 52, 56 to start and interrupt the data writing into the frame memories 42, 44, 46 at an arbitrary timing. When the writing is interrupted, the pixel data constituting a still frame at the timing of the interruption are stored in the memories 42, 44, 46.

The frame memories 42, 44, 46 can store the image data of still frames supplied from the outside, by way of the control bus 75, the window display control circuits 50, 52, 56 and the data lines 70, 72, 74, and the image data of still frames stored in the frame memories 42, 44, 46 can be released to the outside by way of the data lines 70, 72, 74, the window display control circuits 50, 52, 56 and the control bus 75.

The input image stored in the frame memory 42 is processed in the following manner. The CPU 32 sets a cut-out area, selected by the user, in the window display control circuit 50 through the control bus 75. The control circuit 50 reads the pixel data within the cut-out area from the frame memory 42, and the data are supplied through the window display control circuit 50, which effects a variation in the magnification (data skipping and interpolation) on the read image data so as to obtain an image of a predetermined size, and sends thus processed data to the post-processing circuit 78, according to the synchronization signals from the transmission sync signal generating circuit 76. The method of such variation of magnification itself is already known.

The cut-out area from the frame memory 42 and the image magnification can be varied even during the operation, and the window display control circuit 50 adopts the new cut-out area and the new image magnification, in synchronization with the synchronization signals from the transmission sync signal generating circuit 76.

The post-processing circuit 78 effects the post-processing on the R, G, B pixel data from the control circuit 50, in synchronization with the synchronization signals from the generating circuit 76, and the resulting output is supplied to the compression encoding circuit 26 and transmitted to the partner unit.

The input image stored in the frame memory 44 and the received image stored in the frame memory 46 are processed in the following manner. The CPU 32 sets the cut-out areas of the input and received images and the position and area of the display window on the monitor 24, instructed by the user, in the window display control circuits 52, 56 through the control bus 75. The window display control circuits 52, 56 also receive, from the graphic display control circuit 80, the palette data 94 which determine, for each pixel, whether or not to display the input and received images of the cut-out areas in the display window on the monitor 24.

In synchronization with the synchronization signals 90 from the graphic display control circuit 80, the window display control circuits 52, 56 read the pixel data of the set cut-out areas from the frame memories 44, 46, and thus read pixel data are supplied, through the data lines 72, 74, to the window display control circuits 52, 56, which vary the magnification of the pixel data, read from the memories 44, 46, to the predetermined size of the display window (by skipping and interpolation) and send the data to the pixel data selection circuit 92 through the data lines 100, 104. The control circuits 52, 56 also activate the enable signals 102, 106 if, during the supply of the pixel data 100, 104 to the pixel data selection circuit 92, the palette data coincide with those preset in the circuits 52, 56.

The cut-out areas from the frame memories 44, 46 and the image magnification are variable even during the operation, as in the case of the frame memory 42, and the window display control circuits 52, 56 adopt the new cut-out areas and the new magnifications in synchronization with the synchronization signals from the graphic display control circuit 80.

The user can instruct the position, area and cut-out area of the display window for the input and received images to the CPU 32 by an unrepresented operation unit, for example a pointing device such as a mouse, and the instructed information is transferred, through the control bus 75, to the graphic display control circuit 80, which prepares a graphic image frame by means of predetermined palette data according to the entered instructed information and stores the pixel data of the image frame in the graphic memory 82. Thus the graphic image frame data stored in the graphic memory 82 correspond, one-to-one, to the display windows on the entire image frame of the monitor 24.

The graphic display control circuit 80 reads the graphic image frame data from the graphic memory 82 according to the internal synchronization signals, and sends the data through the data line 94 to the window display controls circuit 52, 56 and a palette memory 96, and further supplies the window display control circuits 52, 56 with synchronization signals 90 synchronized with the internal synchronization signals. The palette memory 96 converts the palette data, from the graphic display control circuit 80, into R, G, B pixel data for supply to the pixel data selection circuit 92.

The CPU 32 is capable of controlling the graphic display control circuit 80 through the control bus 75, and the control circuit 80 can vary the selection of the conversion table of the palette data 94, according to a control signal 98. Thus the user can selects the window display frame or the background image of the input and received images.

The pixel data selection processing circuit 92 selects the R, G, B pixel data 100, 104 from the window display control circuits 52, 56 and the R, G, B pixel data 97 from the palette memory 96, according to the synchronization signals 90 from the graphic display control circuit 80, and sends the selected data to a D/A converter 108.

Basically, the pixel data selection processing circuit 92 selects the pixel data 100 when the enable signal 102 is active, or the pixel data 104 when the enable signal 106 is active, or the pixel data 97 when the enable signals 102, 106 are both inactive. When the enable signals 102, 106 are both active, the data 100 or 106 are selected according to the priority set by the CPU 32. Naturally there may be selected the result of logic calculation, such as AND or OR, of the data 97, 100 and 104.

The D/A converter 108 converts the R, G, B pixel data, supplied from the pixel data selection circuit 92, into an analog signal for supply to the monitor 24, which, receiving the synchronization signals 90 from the graphic display control circuit 80, displays the image of the output image signal of the D/A converter 108 according to the synchronization signals.

In the following there will be given a detailed explanation on the input image and the cut-out area (transmission area) thereof, and the received image and the cut-out area (display area) thereof, in case of image communication between terminals A and B. Terminals A and B correspond to operator and partner terminals, respectively. It is assumed that an image "ABC" is entered in the terminal A, while an image "efghij" is entered in the terminal B. In the following description, when the circuit in the terminal A and that in the terminal B have to be clearly identified, the circuit in the terminal A is indicated by a suffix A, and vice versa.

It is assumed, in the terminals A, B, that the input image of the video camera 20 has effective pixels of 640 (horizontal)×480 (vertical), and that the monitor 24 has a resolution or a display ability of 1024 (horizontal)×768 (vertical). The graphic memory 82 can store graphic image data corresponding to the resolving power of the monitor 24.

Figure 4A:
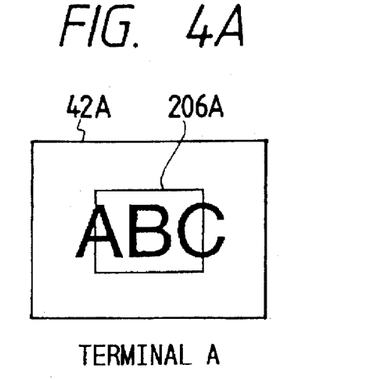
FIGS. 4A and 4B are views showing images stored in frame memories 42A and 42B.
Figure 4B:
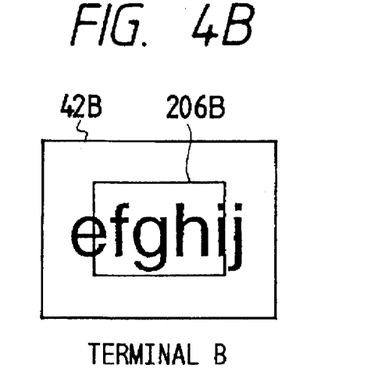
Figure 6A:
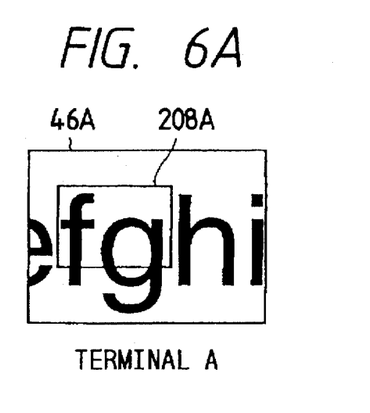
FIGS. 6A and 6B are views showing images stored in frame memories 46A and 46B.
Figure 6B:
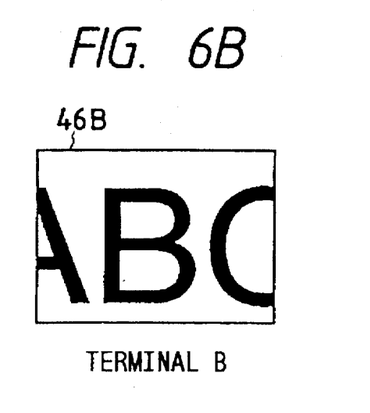
Figure 7A:
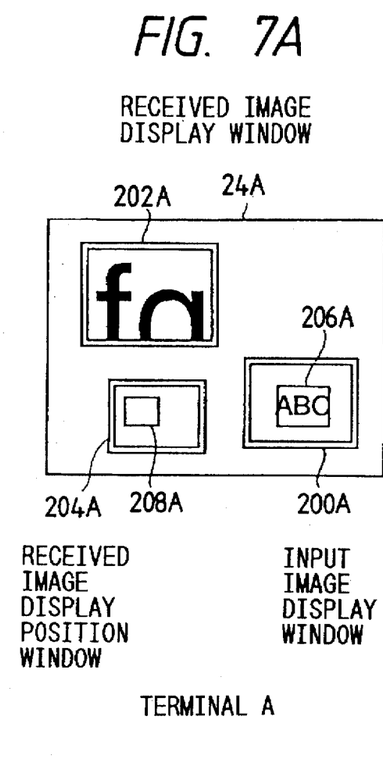
FIGS. 7A and 7B are views showing images displayed on monitors 24A and 24B.
Figure 7B:
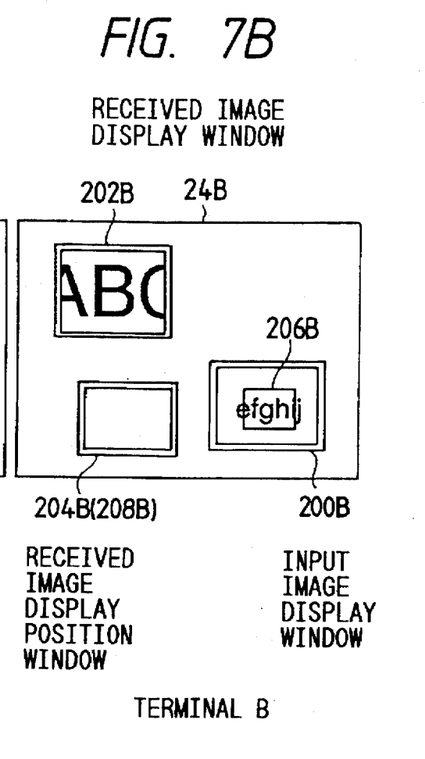
Figure 8A:
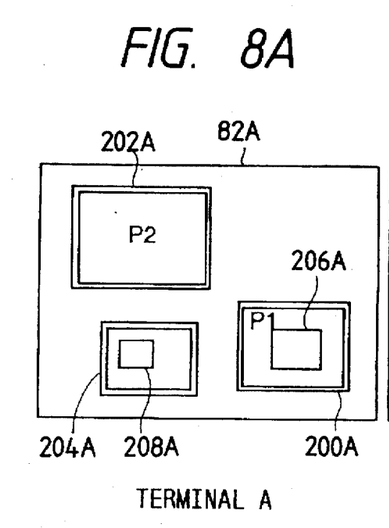
FIGS. 8A and 8B are views showing graphical output images stored in graphical memories 82A and 82B.
Figure 8B:
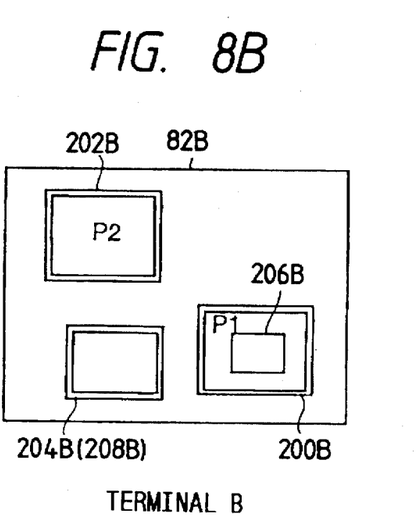
Figure 9A:
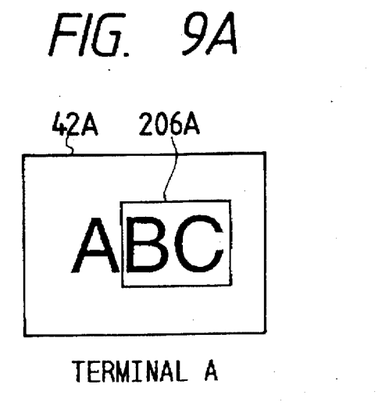
FIGS. 9A and 9B are views showing images stored in frame memories 42A and 42B.
Figure 9B:
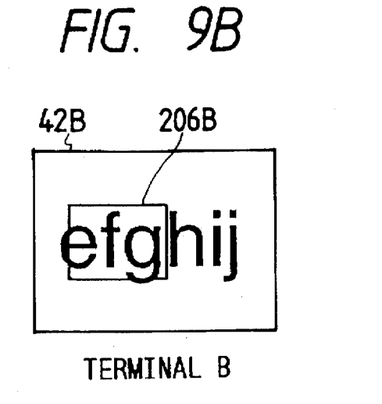
Figure 10A:
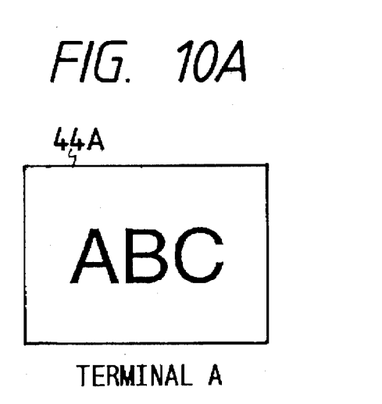
FIGS. 10A and 10B are views showing images stored in frame memories 44A and 44B.
Figure 10B:
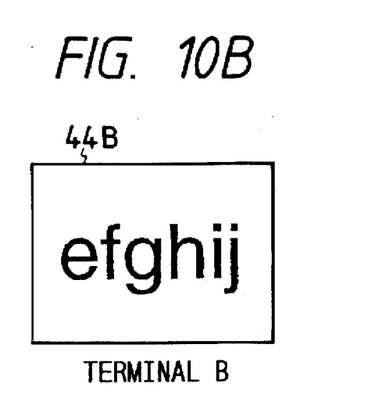
Figure 11A:
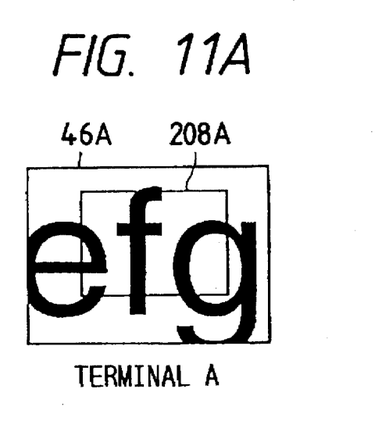
FIGS. 11A and 11B are views showing images stored in frame memories 46A and 46B.
Figure 11B:
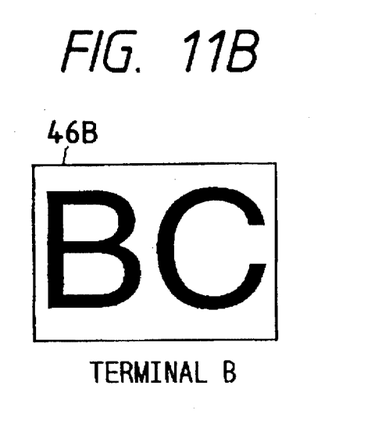
Figure 12A:
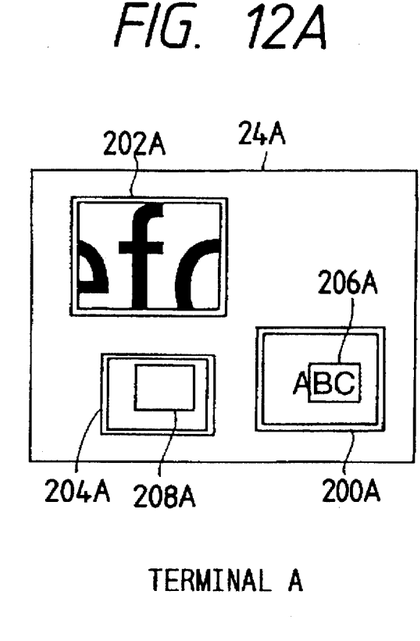
FIGS. 12A and 12B are views showing images displayed on monitors 24A and 24B.
Figure 12B:
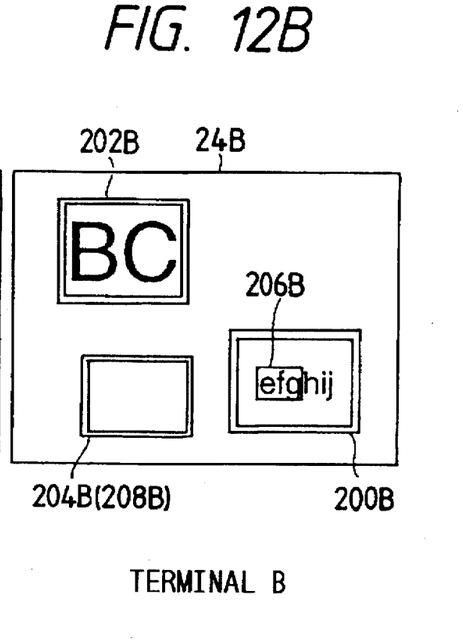
Figure 13A:
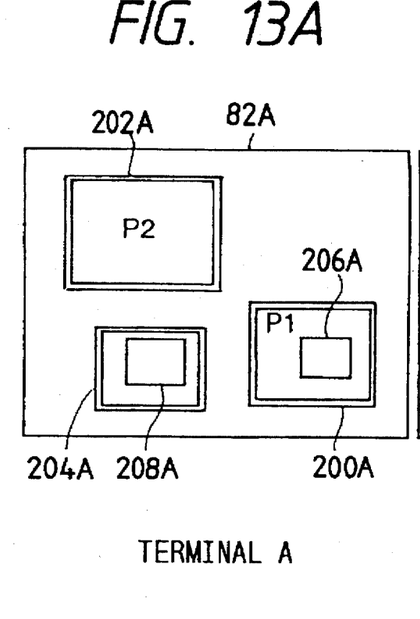
FIGS. 13A and 13B are views showing graphical output images stored in graphical memories 82A and 82B.
Figure 13B:
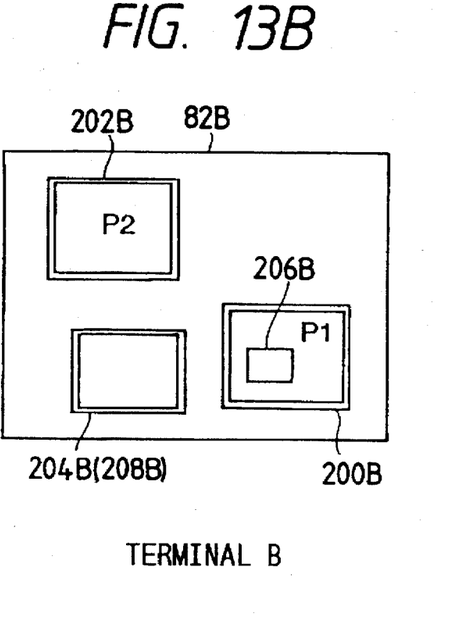

FIGS. 4A to 8B illustrate an example of the processing executed in the image processing circuit 22, wherein FIGS. 4A and 4B; 5A and 5B; and 6A and 6B respectively show the image data stored in the frame memories 42, 44, 46 of the terminals A and B, while FIGS. 8A and 8B show the graphic image data stored in the graphic memories 82. For facilitating the understanding, the data are shown in the form of an image. In this example, the input image is entirely displayed on the monitor 24 of the unit of the input side.

In this embodiment, as shown in FIGS. 7A and 7B, there are set at least three display windows on the monitor 24: i.e. input image display windows 200A, 200B for displaying the entire input images; received image display windows 202A, 202B for displaying selected parts of the received images; and received image display area indicating windows 204A, 204B for displaying the positional relationship of the displayed areas in the entire received images. In the input image display windows 200A, 200B there are displayed rectangular frames 206A, 206B indicating the cut-out areas to be transmitted, and, in the received image display area indicating windows 204A, 204B, there are displayed rectangular frames 208A, 208B indicating the areas cut out for display in the received images.

For facilitating the understanding, in FIGS. 4A and 4B, the rectangular frames 206A, 206B indicating the areas of transmission of the input images are superposedly shown, and, in FIG. 6A, the rectangular frame 208A indicating the display area of the received image is superposedly illustrated.

The palette data corresponding to the windows 200A, 200B to 208A, 208B are stored in the graphic memory 82. In the graphic memory 82, corresponding to the input image display windows 200A, 200B, there are stored palette data for displaying a surrounding window frame, and the interior thereof is completely filled with palette data of a palette number P1 for indicating the input image display area to the window display control circuit 52. Corresponding to the line portions of the rectangular frames 206A, 206B, there are stored palette data different from those of the number P1.

Similarly in the graphic memory 82, corresponding to the received image display windows 202A, 202B, there are stored palette data for displaying a window frame around the areas, and the interior of the area is filled with palette data of a palette number P2 for indicating the received image display areas to the window display control circuit 56. The window display control circuits 52, 56 respectively store the palette numbers P1, P2 in advance.

Also in the areas corresponding to the area displaying windows 204A, 204B, data of a palette number are stored for displaying the window frame around the areas, and, in case the received images are cut out, the line portions (or the entire interiors) of the cut-out frames 208A, 208B are stored.

Figure 5A:
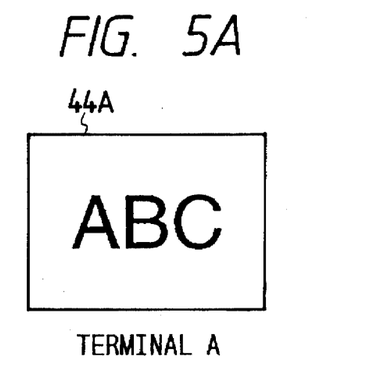
FIGS. 5A and 5B are views showing images stored in frame memories 44A and 44B.

At first, the input image "ABC" of the terminal A is processed in the following manner. The input image "ABC", obtained by the video camera 20A of the terminal A, is stored in the frame memories 42A, 44A as pixel data with effective pixels 640H×480V, as shown in FIGS. 4A and 5A.

The CPU 32A sets, in the window display control circuit 52A through the control bus 75, the X, Y coordinates of the cut-out area from the frame memory 44A, the X, Y coordinates of the position, area and magnification of the input image display window 200A in the output graphic image frame, and the palette number P1 assigned for the input image display. In the example shown in FIGS. 4A to 8B, in the terminal A, the entire input image is displayed in the input image display window 200A. Therefore, if the input image display window 200A contains pixels of 360H×270V, the image magnification will be 9/16.

The window display control circuit 52A reads the pixel data in the cut-out area from the frame memory 44A, then effects a skipping or interpolating operation corresponding to the image magnification of 9/16, and releases the pixel data after the variation of image magnification to a pixel data line 100A. The enable signal 102A is made active if the palette data 94A are P1 during the data output.

During the active state of the enable signal 102A, the pixel data selection circuit 92A selects the pixel data 100A from the window display control circuit 52A. Thus the area of the input image display window 200A in the graphic image frame, stored in the graphic memory 82A, is replaced by the cut-out portion of the input image from the window display control circuit 52A, and the graphic image frame is supplied through the D/A converter 108A to the monitor 24A and displayed thereon as shown in FIG. 7A. Naturally the frame 206A indicating the cut-out area for transmission of the input image is not replaced and is displayed on the monitor 24A.

The transmission of the input image "ABC" is conducted in the following manner. The CPU 32A sets, in the window display control 50A of the terminal A through the control bus 75A, the X, Y coordinates of the cut-out area from the frame memory 42A, and the estimated size and image magnification of the output display image frame. In the example shown in FIGS. 4A to 8B, the transmission is executed in an area of 400H×300V having the center on the character "B" of the input image "ABC", and, if the estimated output display image frame has a size of 640H×480V, the image magnification will be 16/10.

The window display control circuit 50A reads the pixel data in the cut-out area from the frame memory 42A, then effects the skipping/interpolating calculation corresponding to the image magnification 16/10, and the pixel data after the variation of magnification (640 pixels per line times 480 lines) to the post-processing circuit 78A in synchronization with the sync signals from the transmission sync signal generating circuit 76A. The post-processing circuit 78A effects the post-processing on the entered pixel data, and the analog moving image signal, obtained in the post processing is compression encoded in the compression encoding circuit 26A and transmitted to the terminal B.

In this example, since the cut-out area is 10/16 in effective pixels in the input image, the rectangular frame 206A, indicating the cut-out area and displayed in the input image display window 200A, has a size of about 225H×169V.

In the terminal B, the compressed image data transmitted from the terminal A are expanded in the expansion decoding circuit 30B, and are stored as image data with an effective pixel area of 640H×480V, in the frame memory 46B. The CPU 32B sets, in the window display control circuit 56B through the control bus 75B, the X, Y coordinates of the cut-out area from the frame memory 46B, the X, Y coordinates of the position and area of the received image display window 202B in the output graphic image frame, the image magnification and the palette number P2 assigned for displaying the received image.

In the terminal B of this example, the entire received image is displayed in the received image display window 202B. Thus the rectangular frame 208B indicating the cut-out area coincides with the frame of the received image display area displaying window 204B. Consequently, if the area of the received image display window 202B has a pixel area of 560H×420V, the image magnification will be 14/16.

The window display control circuit 56B reads the pixel data in the cut-out area from the frame memory 46B, then effects a skipping/interpolating calculation corresponding to the image magnification 14/16, and the pixel data after the variation of magnification to the pixel data line 100B, in synchronization with the sync signals 90B from the graphic display control circuit 80B. The enable signal 106B is made active if the palette data 94B are P2 during the data output.

During the active state of the enable signal 106B, the pixel data selection circuit 92B selects the pixel data 104B from the window display control circuit 56B. Thus, in the graphic image frame stored in the graphic memory 82B, the area of the received image display window 202B is replaced by the image cut out from the received image and received from the window display control circuit 56B, and the graphic image frame is supplied through the D/A converter 108B to the monitor 24B and displayed thereon as shown in FIG. 7B.

Figure 5B:
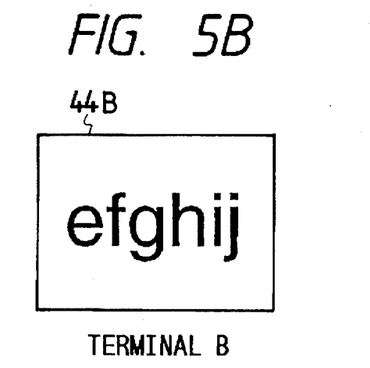

The input image "efghij" of the terminal B is processed in the following manner. The input image "efghij", obtained by the video camera 20B of the terminal B, is stored in the frame memories 42B, 44B as pixel data with effective pixels 640H×480V, as shown in FIGS. 4B and 5B.

The CPU 32B sets, in the window display control circuit 52B through the control bus 75B, the X, Y coordinates of the cut-out area from the frame memory 44B, the X, Y coordinates of the position and area of the input image display window 200B in the output graphic image frame, the image magnification and the palette number P1 assigned for input image display. In the example shown in FIGS. 4A to 8B, the entire input image in the terminal B is displayed in the input image display window 200B. Thus, if the input image display window has a pixel area of 360H×270V, the image magnification will be 9/16.

The window display control circuit 52B reads the pixel data in the cut-out area from the frame memory 44B, then effects a skipping/interpolating calculation corresponding to the image magnification 9/16, and sends the pixel data after the variation of magnification to the pixel data line 100B, in synchronization with the synchronization signals 90B from the graphic display control circuit 80B. The enable signal 102B is activated if the palette data 94B are P1 during the data output.

During the active state of the enable signal 102B, the pixel data selection circuit 92B selects the pixel data 100B from the window display control circuit 52B. Consequently, in the graphic image frame stored in the graphic memory 82B, the area of the input image display window 200B is replaced by the cut-out image of the input image, supplied from the window display control circuit 52B, and the graphic image frame is supplied through the D/A converter 108B to the monitor 24B and displayed as shown in FIG. 7B. Naturally the frame 206B indicating the cut-out area for transmission in the input image is not replaced and displayed on the monitor 24B.

The transmission of the input image "efghij" is executed in the following manner. The CPU 32B of the terminal B sets, in the window display control circuit 50B through the control bus 75B, the X, Y coordinates of the cut-out area from the frame memory 42B, the estimated size of the output display image frame and the image magnification. In the example shown in FIGS. 4A to 8B, the transmission is made in an area of 480H×360V, with the center at the characters "fghi" of the input image. In this case, if the estimated output display image frame has a size of 640H×480V, the image magnification will be 16/12.

The window display control circuit 50B reads pixel data in the cut-out area from the frame memory 42B, then effects a skipping/interpolating calculation corresponding to the image magnification 16/12, and sends the pixel data after the variation of magnification (640 pixels per line×480 lines) to the post-processing circuit 78B, according to the synchronization signals from the transmission sync signal generating circuit 76B. The post-processing circuit 78B effects the post-processing on the entered pixel data, and the obtained analog moving image signal is compression encoded in the compression encoding circuit 26B and is transmitted to the terminal A.

In this example, since the cut-out area is 12/16 in the effective pixels in the input image, the frame 206B, indicating the cut-out area, displayed in the input image display window 200B, has a size of about 270H×203V.

In the terminal A, the compressed image data received from the terminal B are expanded in the expansion decoding circuit 30A, and are stored, as image data with an effective pixel area of 640H×480V, in the frame memory 46A. The CPU 32A sets, in the window display control circuit 56A through the control bus 75A, the X, Y coordinates of the cut-out area from the frame memory 46A, the X, Y coordinates of the position and area of the received image display window 202A in the output graphic image frame, the image magnification, and the palette number P2 assigned for the received image display.

In this example, the terminal A cuts out, from the received image, an area of 320H×240V with the center at the character "f", for display in the received image display window 202A. Thus, if the frame memory 46A has an effective pixel area of 640H ×480V, then if the cut-out area therefrom has a size of 320H×240V and if the received image display window 202A has a size of 560H×420V, the image magnification will be (16/8)×(14/16).

The window display control circuit 56A reads the pixel data in the cut-out area from the frame memory 46A, then effects a skipping/interpolating calculation corresponding to the magnification (16/8) ×(14/16), and sends the pixel data after the variation of magnification to the pixel data line 104A, according to the synchronization signals 90A supplied from the graphic display control circuit 80A. The enable signal 106A is made active if the palette data 94A are P2 during the data output.

During the active state of the enable signal 106A, the pixel data selection circuit 92A selects the pixel data 104A from the window display control circuit 56A. Consequently, in the graphic image frame stored in the graphic memory 82A, the area of the received image display window 202A is replaced by the cut-out image of the input image, supplied from the window display control circuit 56A, and the image frame is supplied through the D/A converter 108A to the monitor 24A and displayed thereon as shown in FIG. 7A.

In the received image display area indicating window 204A of the terminal A, by the cut-out of the received image, the rectangular frame 208A is displayed, indicating the area cut-out for display in the received image. If said indicating window 204A has a size of 160H×120V, the rectangular frame 208A has a size of about 80H×60V.

In the following there will be explained a state when the cut-out areas (transmission areas) of the input images "ABC", "efghij" of the terminal A, B and the cut-out areas (received areas) of the received images are varied from the state shown in FIGS. 4A to 8B. FIGS. 9A to 13B illustrate the images after the variation, respectively corresponding to FIGS. 4A to 8B. In FIGS. 9A, 9B, 11A and 11B, the rectangular frames 206A, 206B indicating the transmission areas of the input images and the rectangular frame 208A indicating the display area of the received image are illustrated superposedly, as in FIGS. 4A, 4B, 6A and 6B.

More specifically, in the terminal A, the cut-out area (transmission area) of the input image "ABC" is shifted from the position centered at "B" to the right to a position centered at "BC", and, in the terminal B, the cut-out area (transmission area) of the input image "efghij" is made narrower from the position centered at "fghi" to a position centered at "f". Also in the terminal A, the display area for the received image is made wider. These instructions are given from the aforementioned operation unit 31.

The input image "ABC" of the terminal A is processed in the following manner. The cut-out size from the frame memory 42A is 400H×300V as explained before, but the cut-out position is shifted to the right. The CPU 32A varies the setting of the X, Y coordinates of the cut-out area from the frame memory 42A, in the window display control circuit 50A through the control bus 75A. Other parameters are not changed.

The variation of setting becomes effective from the first synchronization signals supplied from the transmission sync signal generating circuit 76A. The window display control circuit 50A reads the pixel data of the new cut-out area from the frame memory 42A, then effects a skipping/interpolating operation corresponding to the image magnification 16/10, and sends the pixel data after the variation of magnification (640 pixels per line×480 lines) to the post-processing circuit 78A according to the synchronization signals from the generating circuit 76A. The processes after the post-processing circuit 78A are same as explained before.

With the variation of the cut-out area for transmission, the frame 206A for indicating the transmission area in the output graphic image frame, stored in the graphic memory 82A, is also renewed to a new transmission area, and, on the monitor 24A, the frame 206A is displayed, corresponding to the new cut-out area, in the input image display window 200A.

In the terminal B, the image received from the terminal A is processed as explained before and is displayed in the received image display window 202B.

On the other hand, in the input image "efghij" of the terminal B, the transmission area is made narrower from 400H×300V to 240H×180V and its position is varied. The CPU 32B varies the setting of the X, Y coordinates of the cut-out area from the frame memory 42B and the image magnification, in the window display control circuit 50B through the control bus 75B. If the estimated output image frame has a size of 640H×480V, the new image magnification will become 16/6.

The window display control circuit 50B reads the pixel data of the new cut-out area from the frame memory 42B, then effects a skipping/interpolating operation corresponding to the image magnification 16/6, and sends the pixel data after the variation of magnification (640 pixels per line×480 lines) to the post-processing circuit 78B, according to the synchronization signals from the transmission sync signal generating circuit 76B. The processes after the post-processing circuit 78B are same as explained before.

Also in the terminal B, with the variation of the cut-out area for transmission, the frame 206B for indicating the transmission area in the output graphic image area, stored in the graphic memory 82B, is renewed to a new transmission area, and, on the monitor 24B, the frame 206B is displayed in the input image display window 200B, corresponding to a new cut-out area.

The image transmitted from the terminal B to A is expanded in the expansion decoding circuit 30A and is stored in the frame memory 46A, as image data with an effective pixel area of 640H×480V. It is assumed that the user of the terminal A changes the display area of the received image from a left-side area of 320H×240V to an upper right area of 480H×360V. With the variation, the CPU 32A varies the setting of the X, Y coordinates of the cut-out area from the frame memory 46A and the image magnification in the window display control circuit 56A through the control bus 75A. More specifically, the cut-out area is changed to 480H×360V, while the frame memory 46A has an effective pixel area of 640H×480V, and the received image display area 202A remains as 560H×420V. Thus the image magnification becomes (16/12)×(14/16). The variation of the parameters of the window display control circuit 56A becomes effective in synchronization with the synchronization signals 90A.

The window display control circuit 56A reads the pixel data of the new cut-out area from the frame memory 46A, and effects a skipping/interpolating calculation corresponding to the image magnification (16/12)×(14/16). The image data after the variation of magnification is processed as explained before, and is played in the received image display window 202A.

With the variation of the cut-out area of the received image, the data for the rectangular frame 208A indicating the cut-out area of the received image display are varied corresponding to the new cut-out area, and, on the monitor 24A, the rectangular frame 208A is displayed at a new position indicating the cut-out area of the received image display, in the received image display area indicating window 204A.

In the above-explained embodiment, the image magnification of the input image can be varied electronically by enlarging or reducing the transmission area of the input image, and the input image can be electronically tilted or panned by moving the transmission area vertically or horizontally. Consequently the effects of a zoom lens or a swinging mechanism can be obtained without these mechanisms. These effects are particularly effective in case of transmitting a moving image signal reproduced in an image reproducing apparatus. Also the transmission area within the entire input image can be constantly confirmed since the transmission area is displayed as a rectangular frame on the monitor of the transmitting terminal. Also since the image outside the transmission area is displayed, the surrounding or background image can be constantly monitored even during the transmission of a close-up shot.

Furthermore, as an arbitrary portion (display area) can be selected within the received image for monitor display, the arbitrary area of the received image can be observed with an appropriate magnification, independently from the transmission terminal. Also the positional relationship of the displayed image in the received image can be constantly confirmed, as the relationship is displayed in an exclusive window. An effect similar to the swinging of the video camera in the transmission terminal can be achieved by vertically and/or horizontally moving the display area within the entire received image.

A part of the circuit shown in FIG. 3 may naturally be realized by a software, and the dimension and position of the display windows 200, 202, 204 may be dynamically varied as in the known window display systems.

Also the present invention is not limited to an embodiment in which the display windows 200, 202, 204 are displayed in a monitor image frame, but there may be employed plural monitors or image display units. For example, an exclusive display unit may be assigned for the display window 204.

Also the window 204 for displaying the display area of the received image may be replaced by a mark, indicating the display area of the received image, attached to the frame of the received image display window 202, and there may be provided a configuration in which the display area of the received image is expanded, reduced or moved by the manipulation of the mark. Same applies to the transmission area of the input image. These factors are merely a design concept in the graphical user interface.

In the above-explained embodiment, the transmission is conducted between the terminals A and B of an identical structure, but they may be mutually different in the display ability of the monitor 24, in the size of the windows 200, 202, 204 etc. The terminals have to be unified, however, for example in the numbers of vertical and horizontal pixels of the image to be transmitted.

As will be easily understood from the foregoing, the above-explained embodiment can dispense with the zoom lens or the swinging mechanism and can still attain the equivalent effects. Also the responsiveness is significantly improved, due to the absence of delay in time, resulting from the control of such zoom lens or swinging mechanism.

Also there is obtained an advantage that the performance is not affected by the functions of the partner terminal, because the desired effects can be attained by electronic processes within the own terminal. This factor is particularly useful in case of connecting different models of terminals.

Also in the foregoing embodiment, the sizes of the windows 206A, 206B are automatically controlled by the graphic display control circuit 60, according to the compression rate of the compression encoding circuit 12 which effects compression encoding of the moving image.

Also the size of the window 206A may be controlled according to the transfer rate of the communication channel.

What is claimed is:

1. An image communication apparatus comprising:
    input means for inputting an image signal;
    setting means for setting a desired area from the image signal;
    extraction means for extracting the desired area set by said setting means, from the input image signal;
    transmission means for transmitting the extracted image signal;
    first display means for displaying a relative position between the image signal and the desired area; and
    second display means for displaying the extracted image signal,
    wherein the image signal displayed on said second display means changes according to a change of the desired area.

2. An image communication apparatus according to claim 1, further comprising:
    reproduction means for reproducing the image signal, inputted by said input means, as a visible image.

3. An image communication apparatus according to claim 1, wherein the image signal is a color image signal.

4. An image communication apparatus according to claim 1, wherein said input means is a video camera.

5. An image communication apparatus according to claim 1, wherein said first display means is adapted for providing graphic display of the area set by said setting means.

6. An image communication apparatus according to claim 1, further comprising:
    reception means for receiving an image signal from the outside through a communication channel.

7. An image communication apparatus according to claim 6, further comprising:
    display means for displaying an area of an image represented by the image signal received by said reception means.

8. An image communication method comprising the steps of:
    inputting an image signal;
    setting a desired area from the image signal;
    extracting the desired area from the image signal;
    transmitting the extracted image signal;
    displaying a relative position between the image signal and the desired area; and
    displaying the extracted image signal,
    wherein the extracted image signal displayed changes according to a change of the desired area.

9. An image communication apparatus comprising:
    reception means for receiving an image signal from the outside;

setting means for setting an area in the image signal received by said reception means;

first display means for displaying which area is the area set by said setting means in an image represented by the image signal; and second display means for displaying the received image signal, wherein the image signal displayed on said second display means changes according to a change of the area set by said setting means.

10. An image communication apparatus according to claim 9, wherein the image signal is a color image signal.

11. An image communication apparatus according to claim 9, wherein said display means is adapted to effect graphic display of the area.

12. An image communication apparatus according to claim 9, further comprising:

instruction means for instructing a variation of the area.

13. An image communication method comprising the steps of:

receiving an image signal from the outside;

setting an area in the received image signal;

displaying which area is the area set, in an image represented by the received image signal; and displaying the received image signal, wherein the received image signal displayed changes according to a change of the area set in said setting step.

* * * * *